(12) United States Patent
Marek

(10) Patent No.: US 7,840,000 B1
(45) Date of Patent: Nov. 23, 2010

(54) HIGH PERFORMANCE PROGRAMMABLE CRYPTOGRAPHY SYSTEM

(75) Inventor: James A. Marek, Anamosa, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1166 days.

(21) Appl. No.: 11/189,089

(22) Filed: Jul. 25, 2005

(51) Int. Cl.
*H04K 1/00* (2006.01)
*H04L 9/00* (2006.01)
*H04L 9/28* (2006.01)

(52) U.S. Cl. ........................................... 380/28
(58) Field of Classification Search ............ 380/28
See application file for complete search history.

(56) References Cited

U.S. PATENT DOCUMENTS

| | | | | |
|---|---|---|---|---|
| 6,101,255 A | * | 8/2000 | Harrison et al. | 380/52 |
| 7,200,229 B2 | * | 4/2007 | Spring et al. | 380/52 |
| 2005/0027970 A1 | * | 2/2005 | Arnold et al. | 712/226 |
| 2006/0059286 A1 | * | 3/2006 | Bertone et al. | 710/260 |

* cited by examiner

*Primary Examiner*—Kambiz Zand
*Assistant Examiner*—Stephen Sanders
(74) *Attorney, Agent, or Firm*—Matthew J. Evans; Daniel M. Barbieri

(57) ABSTRACT

The present invention is a method and system for high performance programmable cryptography. In an embodiment of the invention, a cryptography system in accordance with the present invention may include a processor with memory, at least two field programmable gate array (FPGA) blocks and control logic which may be algorithm independent. Programming files storing one or more crypto algorithms may be maintained remotely to the cryptography system whereby the cryptography system may remain not cryptographically controlled when un-programmed. FPGA blocks may be field-programmed to allow execution of a desired crypto algorithm. Additionally, with multiple FPGA logic blocks, programming of a first FPGA block may be simultaneously performed with the execution of a crypto algorithm via a second FPGA block to enable enhanced encryption rate performance.

19 Claims, 4 Drawing Sheets

HIGH PERFORMANCE PROGRAMMABLE CRYPTOGRAPHY SYSTEM

FIELD OF THE INVENTION

The present invention relates generally to cryptography systems, and more particularly to a high performance programmable cryptography system.

BACKGROUND OF THE INVENTION

Interception of data across wireless communication networks and through worldwide networks such as the Internet is an increasing concern. Consequently, cryptography systems have been employed to prevent the interception of data. Cryptography systems scramble data to prevent unauthorized access to the data. Cryptography systems may operate to process the data according to a crypto algorithm. A crypto algorithm may refer to a procedure or sequence of rules, steps or a series of mathematical equations which describe a cryptographic process.

Cryptography systems are typically subject to two competing requirements, performance and programmability. Performance refers to the rate of data processed per unit time. Cryptography may operate as a bottleneck to the rapid transmission of data, consequently, the more data processed per unit time by a cryptography system improves the overall performance of a communication system. Additionally, the ability to execute a variety of crypto algorithms or several variations of a crypto algorithm further increases the protection of data.

Conventional cryptography systems may be implemented via a hardware system whereby the hardware system is configured to execute a specific crypto algorithm. Cryptography systems with hardware system implementations provide solid performance but are limited by the inability to execute other crypto algorithms or other variations of a crypto algorithm. Also, cryptography systems with hardware system implementations are unable to be upgraded. Another drawback of hardware implementations of cryptography systems is the incorporation of the crypto algorithm within the implementation. When a crypto algorithm is incorporated within the hardware-based implementation, the implementation is a cryptographically controlled item (CCI). A CCI product is deemed secured information handling equipment and is subject to a special set of control requirements, including export controls. As a result, the hardware-based implementation of a cryptography system may not be distributable to foreign entities.

Processor-based implementations of cryptography systems have been developed to allow execution of multiple crypto algorithms or variations of a crypto algorithm. A problem with conventional processor-based implementations is performance. Conventional processor-based implementations of cryptography systems typically do not include the necessary infrastructure to support the efficient execution of crypto algorithms. Consequently, a high performance programmable cryptography system is necessary.

SUMMARY OF THE INVENTION

Accordingly, the present invention is directed to a high performance programmable cryptography system. In an embodiment of the invention, a cryptography system in accordance with the present invention may include a processor with memory, at least two field programmable gate array (FPGA) blocks and algorithm independent crypto generation block. Programming files storing one or more crypto algorithms may be maintained remotely to the cryptography system whereby the cryptography system may remain not cryptographically controlled when un-programmed. FPGA blocks may be field-programmed to allow execution of a desired crypto algorithm. Additionally, with multiple FPGA logic blocks, programming of a first FPGA block may be simultaneously performed with the execution of a crypto algorithm via a second FPGA block to enable enhanced encryption rate performance.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to a presently preferred embodiment of the invention, an example of which is illustrated in the accompanying drawings.

Figure 1:
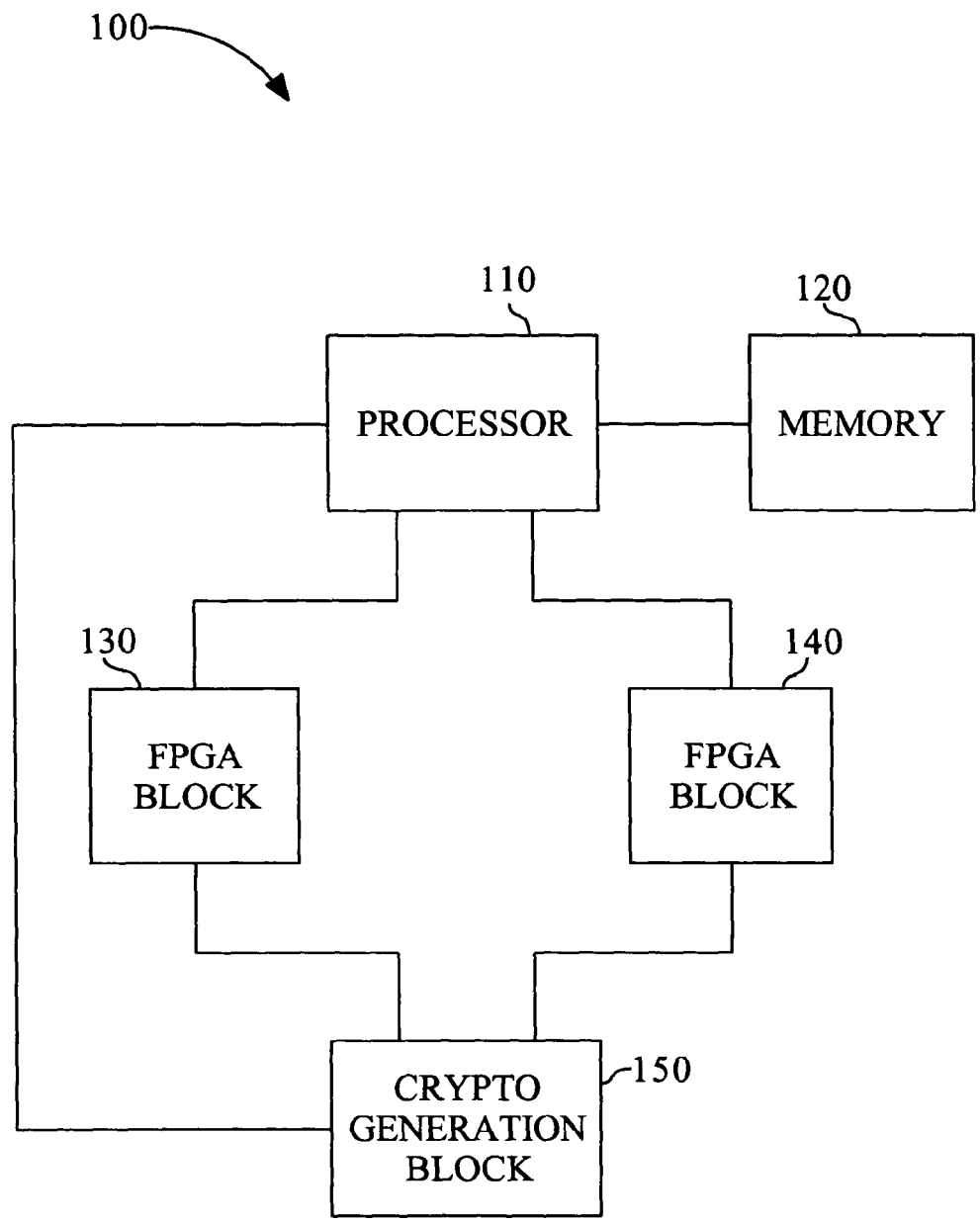
FIG. 1 depicts a block diagram of a cryptography system in accordance with an embodiment of the present invention.

Referring to FIG. 1, a block diagram of a cryptography system 100 in accordance with an embodiment of the present invention is shown. Cryptography system 100 may include a processor 110, memory 120, field programmable gate array (FPGA) blocks 130, 140 and a crypto generation block 150. Programming files containing crypto algorithms may be maintained outside of the cryptography system. Additionally, algorithms employed to decrypt the programming files may also be maintained external to the cryptography system. This may ensure that cryptography system 100 may be not a cryptographic controlled item (CCI) and subject to the control requirements of a CCI product.

Processor 110 may be employed to control the operation of the FPGA blocks 130, 140 and provide high performance cryptography. Processor 110 may retrieve a programming file containing a crypto algorithm. Memory 120 may store a retrieved programming file containing a crypto algorithm and may include an algorithm for bootstrapping the system. An algorithm for bootstrapping the system may be a non-CCI algorithm which may provide basic decryption capability in order for a user to decrypt and verify the validity of basic system operation code and to support loading the first algorithm and/or keys to decrypt the crypto algorithm. Until a first key is loaded, the system 100 may remain non-CCI product. Once the first key is loaded, the system 100 may have the capability to decrypt and load controlled algorithms and keys and execute as a CCI item. Programming of a FPGA block 130 may be performed simultaneously with execution of a crypto algorithm on a FPGA block 140. Crypto generation block 150 may be algorithm independent and operable with any type of crypto algorithm. Crypto generation block 150 may include algorithm independent cryptography components, dataflow logic and may include hardware such as a random number generator, math function accelerators, I/O devices and the like.

Since FPGA blocks 130, 140 may operate independently and simultaneously with each other under the control of processor 110, rapid re-programming of the cryptography system may be achieved. One FPGA block 130 may be programmed while a second FPGA block 140 is executing a crypto algorithm. After execution, the first FPGA block 130 may execute a crypto algorithm while a second FPGA block is being simultaneously programmed. It is contemplated that the second FPGA block may be programmed with the same crypto algorithm or a different crypto algorithm without departing from the scope and intent of the present invention. By allowing simultaneous execution and programming of a second FPGA block, enhanced encryption rate performance by reducing delays caused by re-programming of a FPGA block 130, 140 may be achieved. Additionally FPGA blocks 130, 140 may also provide greater capability for larger algorithms and greater capability for parallel processing.

It is contemplated that cryptography system 100 may be employed in a secure communication system whereby multiple levels of security may be maintained. For example, secure communication systems may include partitioning to maintain isolation of classified data and unclassified data. Cryptography system 100 may operate to support a secure communication system with multiple levels of security. Processor 110 may operate to ensure separation of data classifications. In one embodiment of the invention, cryptography system 100 may be employed within a Multiple Independent Levels of Security (MILS) system. Processor 110 may be a MILS certified processor for maintaining isolation of data in a MILS system. One example of MILS certified processor is Rockwell Collins AAMP7 processor. Processor 110 may perform loading and scrubbing of FPGA blocks 130, 140 between processing contexts to maintain isolation and allow rapid-reprogramming FPGA blocks 130, 140. Loading may refer to programming the algorithms and loading it with keys and configuration data to implement the crypto algorithm. Scrubbing may refer to the function of removing all remnants of data algorithm and configuration information with the FPGA blocks 130, 140 and any associated hardware blocks to assure no exfiltration of data from one classification level to another classification level. With each re-program of a FPGA block, a change of classification level of the algorithm and/or data being processed, an assurance of no information transfer is necessary for maintaining MILS separation with the FPGA blocks 130, 140 and associated hardware. This may provide Isolation through separation of multiple security levels in addition to the performance benefit acquired by simultaneous execution and programming of separate FPGA blocks 130, 140.

Figure 2:
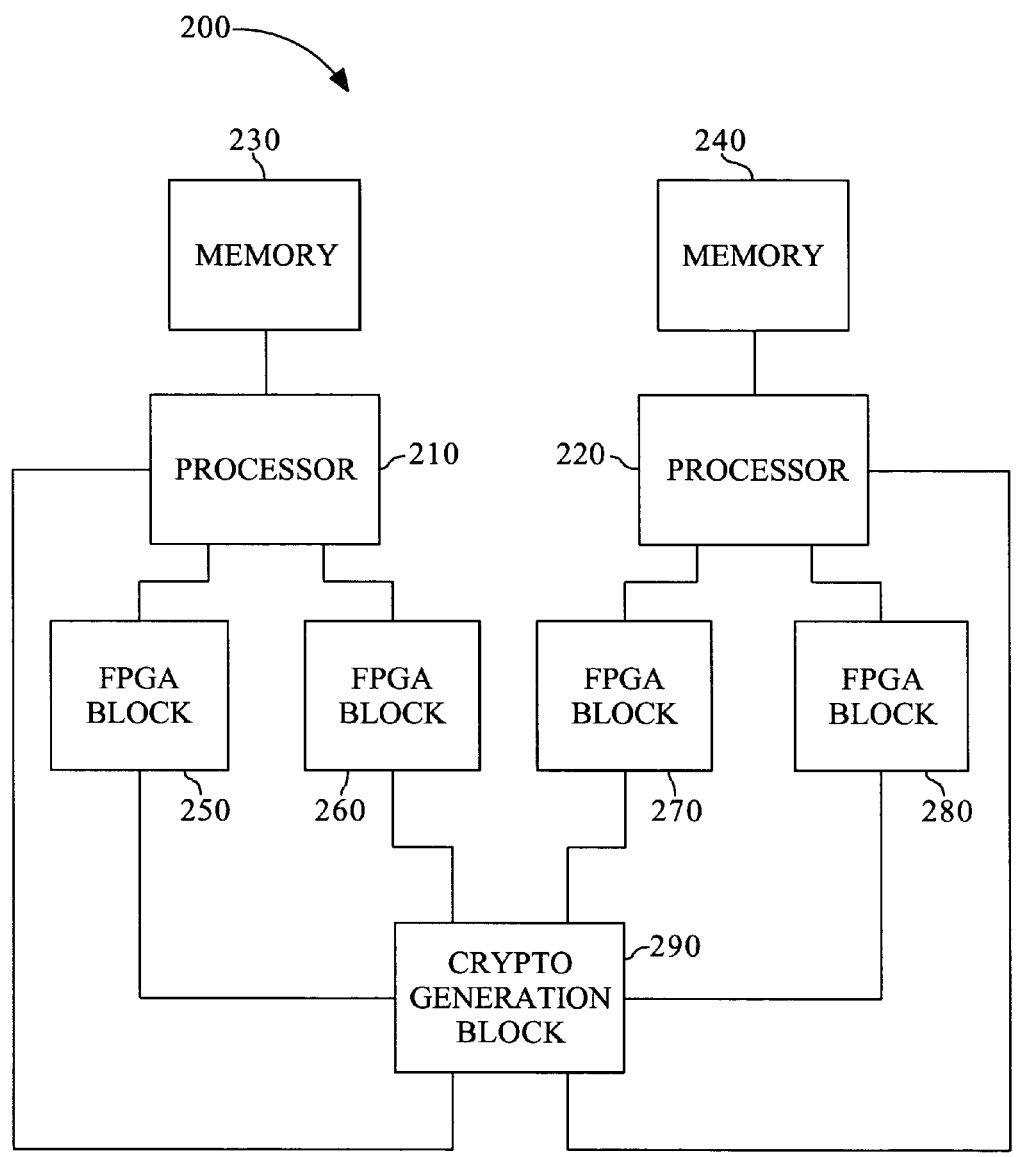
FIG. 2 depicts a block diagram of a cryptography system in accordance with an alternative embodiment of the present invention.

Referring to FIG. 2, a block diagram of a cryptography system 200 in accordance with an alternative embodiment of the present invention is shown. It is contemplated that the cryptography system of the present invention may include 1 to N processors, 1 to P FPGA blocks, 1 to M memory blocks and 1K additional crypto generation blocks. For example, cryptography system 200 may include processors 210, 220 memory 230, 240, FPGA data blocks 250-280 and crypto generation block 290.

Cryptography system 200 may support enhanced cryptography performance while also maintaining separation of multiple security levels. It is contemplated that cryptography system 200 may provide increased encryption rate performance. A multiple channel system may be achieved to allow simultaneous programming and processing of crypto algorithms. For example, multiple FPGA blocks may be programmed simultaneously with execution of a crypto algorithm on another FPGA block. Additionally, multiple FPGA data blocks may execute a crypto algorithm simultaneously with the programming of another FPGA block. It is further contemplated that parallel execution of a crypto algorithm may be achieved while maintaining separation according to a MILS system.

It is further contemplated that parallel processing may be achieved with parallel programming employing multiple FPGA blocks 250-280 with multiple processors 210, 220 as shown in cryptography system 200 of FIG. 2. For example, FPGA blocks 250, 260 may be programmed with FPGA blocks 270, 280 are executing a crypto algorithm. Additionally, FPGA blocks may be programmed to program other FPGA blocks. Data may be processed in one FPGA block, while the second FPGA is being programmed, then the first and second FPGA block both process data, then the one is re-programmed while the other processes data. It is further contemplated that some algorithms may be handled by the processor with no FPGA block intervention, thus a third channel may be provided. Thus, the bootstrapping algorithm may be loaded into a processor to execute as start-up time and loading may be longer and less computationally intense than typical data processing.

Figure 3:
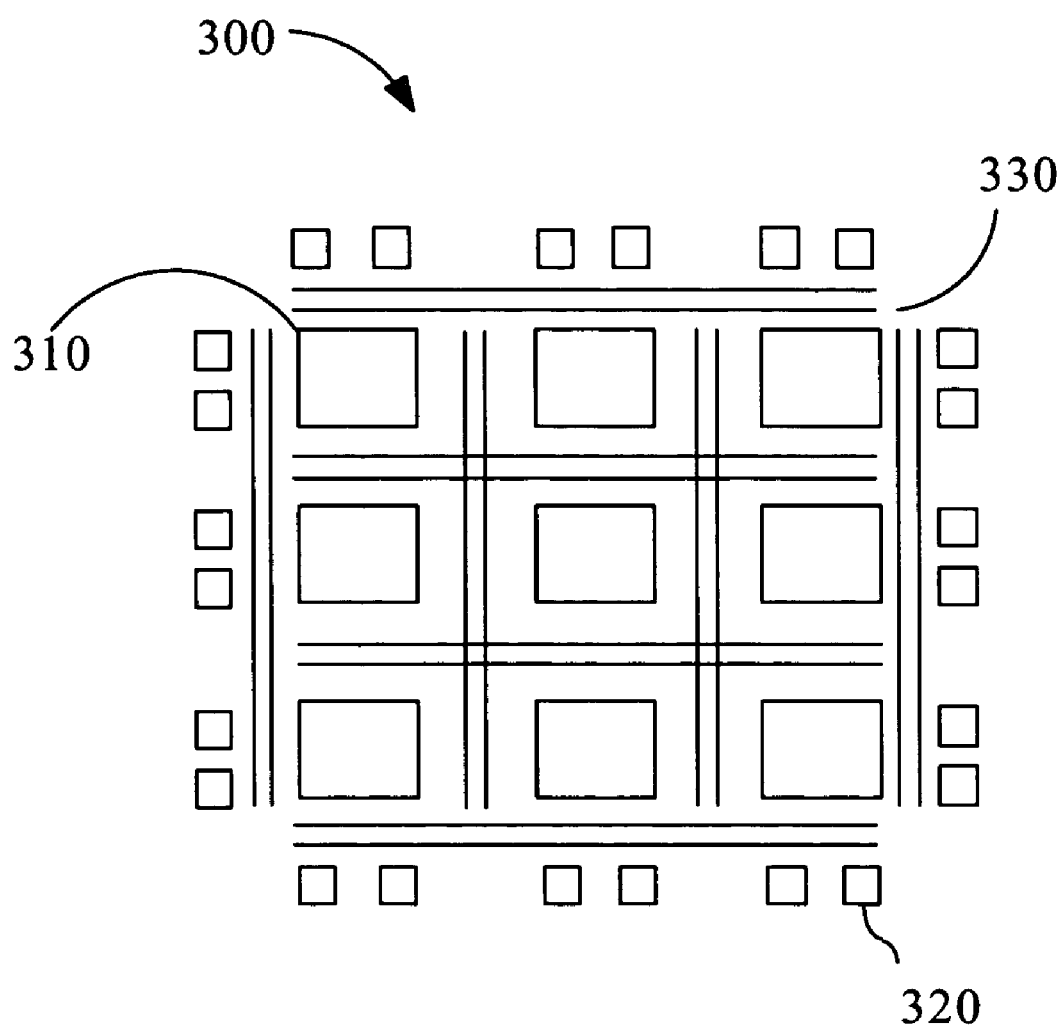
FIG. 3 depicts a FPGA block in accordance with an embodiment of the present invention.

Referring to FIG. 3, a FPGA block 300 in accordance with an embodiment of the present invention is shown. FPGA block 300 may be representative of FPGA block 130, 140 of FIG. 1 and FPGA block 250-280 of FIG. 2. FPGA block 300 may refer to a semiconductor device which may employ gate array technology that may be re-programmed after it is manufactured. FPGA block 300 may include logic blocks 310, input/output (I/O) pads 320 and routing channels 330. Logic block 310 may include a lookup table, flip-flop and the like capable of receiving multiple inputs and providing at least one output. Crypto algorithms may be converted into a hardware description language (HDL), which when compiled, may be mapped to the FPGA block 300. Example of HDLs may include VHDL and Verilog. Pre-defined complex functions and circuits, commonly referred as intellectual property blocks, may be stored within a library for use in the programming of the FPGA block 300.

Figure 4:
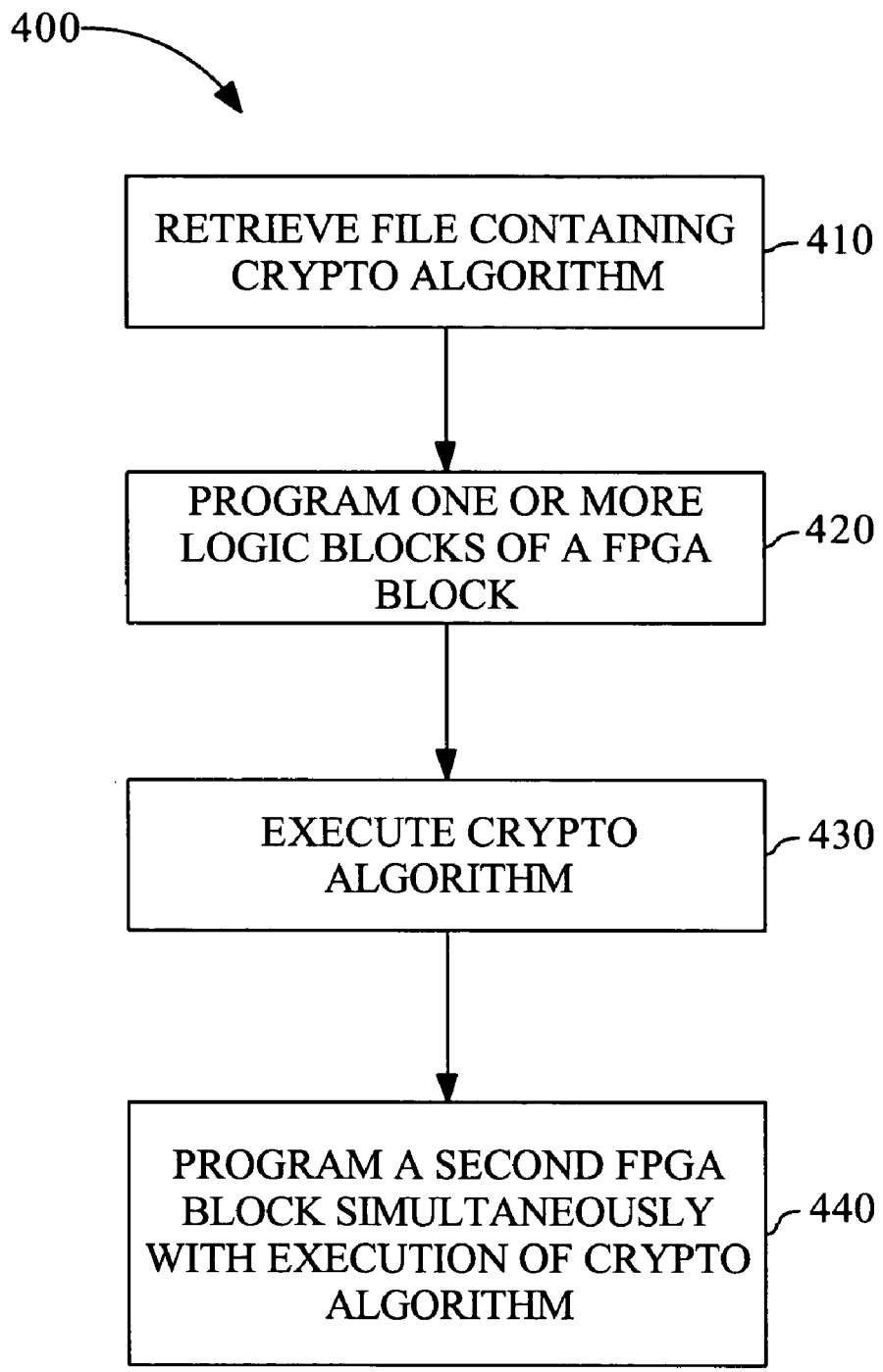
FIG. 4 depicts a process for encrypting data in accordance with an embodiment of the present invention.

Referring to FIG. 4, a process 400 for encrypting data in accordance with an embodiment of the present invention is shown. It is contemplated that process 400 may be executed by cryptography system 100 of FIG. 1 and cryptography system 200 of FIG. 2. Process 400 may begin by retrieving a file containing a crypto algorithm 410. The file containing a crypto algorithm may be stored outside of cryptography system 100, 200 whereby cryptography system 100, 200 may remain a non CCI product when un-programmed. The crypto algorithm may be converted to a compiled/synthesized HDL and programming of one or more logic blocks of a FPGA block 420 may be performed. The HDL may be compiled on synthesized into a binary or load file targeted to a specific FPGA block implementation similar to compiling a "C" program to an executable that may be loaded and run on a processor. Once a FPGA block is programmed, a crypto algorithm may be executed to encrypt data in accordance with the crypto algorithm 430. Simultaneous to the execution of the crypto algorithm, programming of a second FPGA block may be performed. Programming of a second FPGA block during execution of a crypto algorithm on a first block may reduce the delays caused by programming of a FPGA blocks and increase the overall system level data encryption rate. Increase of the data encryption rate enhances the overall performance of a communication system by reducing the bottleneck caused by conventional cryptography systems. In accordance with method 400 for encrypting data, separation of data between a field programmable gate array and a second field programmable gate array may be maintained in accordance with a MILS compliant system.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A cryptography system, comprising:
    a processor;
    a memory coupled to said processor; and
    a plurality of field programmable gate array blocks coupled to said processor, the plurality of field programmable gate array blocks including a first field programmable gate array block and a second field programmable gate array block, the first field programmable gate array block being configured for being programmed to execute a first crypto algorithm, the first field programmable gate array block being further configured for executing the first crypto algorithm, the second field programmable gate array block being configured for being programmed to execute at least one of the first crypto algorithm and a second crypto algorithm, the second field programmable gate array block being further configured for executing the at least one of the first crypto algorithm and the second crypto algorithm,
    wherein the system is configured for allowing said programming of the first field programmable gate array block and said execution of at least one of the first crypto algorithm and the second crypto algorithm by the second field programmable gate array block to occur concurrently, the second field programmable gate array block being further configured for programming the first field programmable gate array block.

2. The cryptography system as claimed in claim 1, further comprising algorithm independent cryptography components.

3. The cryptography system as claimed in claim 1, wherein said processor is a multiple independent levels of security (MILS) certified processor.

4. The cryptography system as claimed in claim 3, wherein said MILS certified processor maintains separation of data according to security level between said first field programmable gate array block and second field programmable gate array block.

5. The cryptography system as claimed in claim 1, wherein said system is configured for allowing said programming of the second field programmable gate array block and said execution of said first crypto algorithm by said first field programmable gate array to occur concurrently.

6. The cryptography system as claimed in claim 1, wherein each field programmable gate array block includes one or more logic blocks.

7. A method for encrypting data via a cryptography system, comprising:
    programming a first field programmable gate array block to execute a first crypto algorithm;
    retrieving at least one of said first crypto algorithm and a second crypto algorithm from a remote system, wherein at least one of said first crypto algorithm and said second crypto algorithm is maintained by the remote system, said remote system being connected to the cryptography system, the remote system being external to the cryptography system, at least one of said first crypto algorithm and second crypto algorithm being included in a programming file maintained by said remote system, at least one programming file decryption algorithm being maintained by said remote system; and
    executing at least one of said first crypto algorithm and said second crypto algorithm via a second field programmable gate array block to encrypt data, wherein said programming of the first field programmable gate array block and said executing of the at least one of said first crypto algorithm and said second crypto algorithm via the second field programmable gate array block occurs concurrently.

8. The method as claimed in claim 7, wherein said data is encrypted in accordance with said first crypto algorithm.

9. The method as claimed in claim 7, wherein separation of data between said field programmable gate array and second field programmable gate array is maintained.

10. A cryptography system, comprising:
    a multiple independent levels of security (MILS) certified processor;
    a memory coupled to said processor; and
    a plurality of field programmable gate array blocks coupled to said processor, the plurality of field programmable gate array blocks including a first field programmable gate array block and a second field programmable gate array block, the first field programmable gate array block being configured for being programmed to execute a first crypto algorithm, the first field programmable gate array block being further configured for executing the first crypto algorithm, the second field programmable gate array block being configured for being programmed to execute at least one of the first crypto algorithm and a second crypto algorithm, the second field programmable gate array block being further configured for executing the at least one of the first crypto algorithm and the second crypto algorithm,
    wherein the system is configured for allowing said programming of the first field programmable gate array block and said execution of at least one of the first crypto algorithm and the second crypto algorithm by the second field programmable gate array block to occur concurrently, the second field programmable gate array block being further configured for programming the first field programmable gate array block.

11. The cryptography system as claimed in claim 10, further comprising algorithm independent cryptography components.

12. The cryptography system as claimed in claim 10, wherein said MILS certified processor maintains separation of data according to security level between said first field programmable gate array block and second field programmable gate array block.

13. The cryptography system as claimed in claim 10, wherein said system is configured for allowing said programming of the second field programmable gate array block and said execution of said first crypto algorithm by said first field programmable gate array to occur concurrently.

14. The cryptography system as claimed in claim 10, wherein each field programmable gate array block includes one or more logic blocks.

15. A cryptography system, comprising:
- a first processor;
- a first memory coupled to said first processor;
- a second processor;
- a second memory coupled to said second processor; and
- a plurality of field programmable gate array blocks coupled to each of said first processor and said second processor, the plurality of field programmable gate array blocks including a first field programmable gate array block and a second field programmable gate array block, the first field programmable gate array block being configured for being programmed to execute a first crypto algorithm, the first field programmable gate array block being further configured for executing the first crypto algorithm, the second field programmable gate array block being configured for being programmed to execute at least one of the first crypto algorithm and a second crypto algorithm, the second field programmable gate array block being further configured for executing the at least one of the first crypto algorithm and the second crypto algorithm,
- wherein the system is configured for allowing said programming of the first field programmable gate array block and said execution of at least one of the first crypto algorithm and the second crypto algorithm by the second field programmable gate array block to occur concurrently, the second field programmable gate array block being further configured for programming the first field programmable gate array block.

16. The cryptography system as claimed in claim 15, further comprising algorithm independent cryptography components.

17. The cryptography system as claimed in claim 15, wherein said first processor and said second processor are multiple independent levels of security (MILS) certified processors.

18. The cryptography system as claimed in claim 17, wherein said MILS certified processors maintain separation of data according to security level.

19. The cryptography system as claimed in claim 15, wherein a third field programmable gate array block included in the plurality of field programmable gate array blocks is configured for being programmed to execute the first crypto algorithm, the third field programmable gate array block being further configured for executing the first crypto algorithm, the system being configured for allowing said executing of the first crypto algorithm by the third field programmable gate array block and said execution of at least one of said first crypto algorithm or said second crypto algorithm by said second field programmable gate array to occur concurrently.

* * * * *